Oct. 28, 1947.          F. G. CARR                2,429,802
                    MOTOR SCOOTER FRAME
                    Filed Oct. 16, 1945
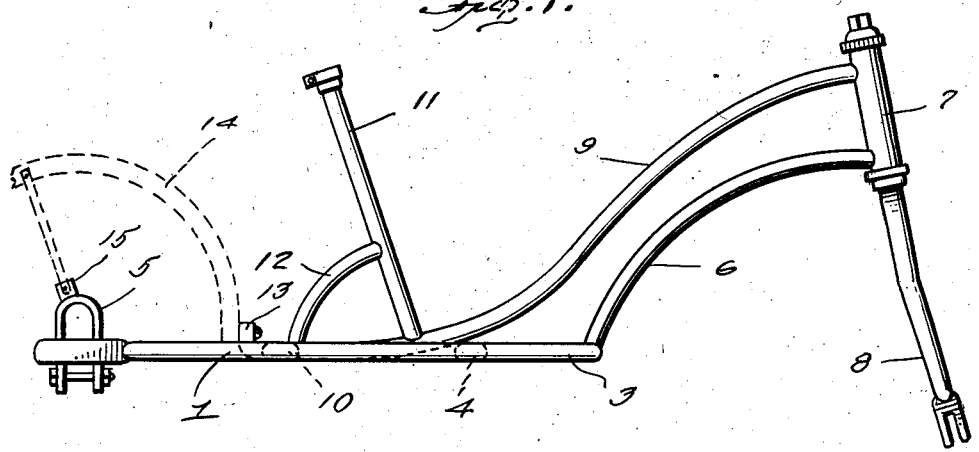
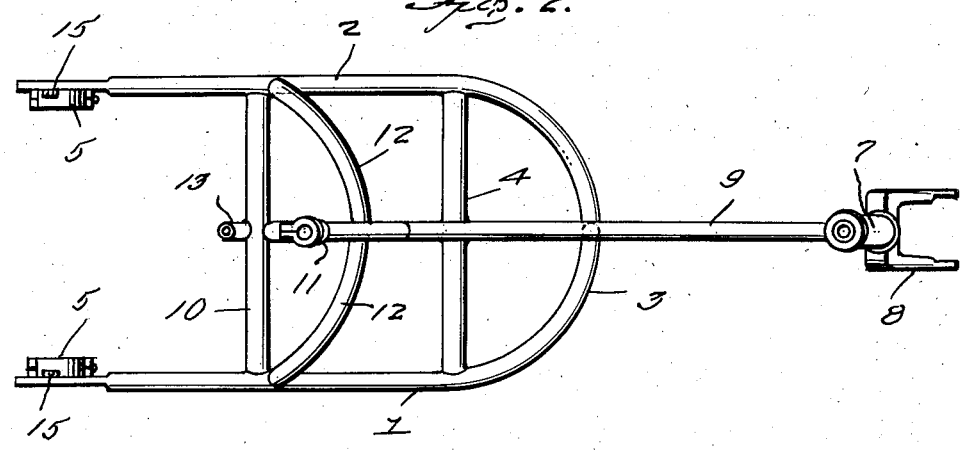
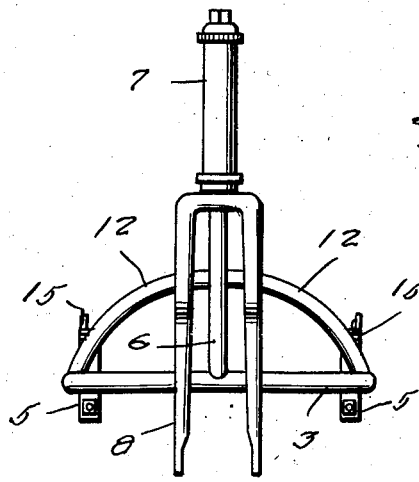
Inventor
Floyd G. Carr
Attorneys Patented Oct. 28, 1947

2,429,802

UNITED STATES PATENT OFFICE 2,429,802

MOTOR SCOOTER FRAME

Floyd G. Carr, Lancaster, N. H.

Application October 16, 1945, Serial No. 622,555

2 Claims. (Cl. 280—281)

1

The present invention relates to motorcycle frames and is more particularly concerned with a frame for the type of motorcycles known as motor scooters.

One of the objects of the invention is to provide a motor scooter frame which is light weight and yet strong enough to withstand road shocks.

A further object of the invention is to provide a motor scooter frame of simpler and more compact construction than what is disclosed in prior devices.

With the foregoing and other objects and advantages in view, the invention consists of the novel construction and arrangement of parts hereinafter described and claimed.

In the accompanying drawings illustrating the invention.

Figure 1 is a side elevation of the frame.
Figure 2 is a top plan view thereof.
Figure 3 is a front elevation thereof.

Like numerals in the description and drawings designate the same parts of construction.

The main body of the frame consists of substantially horizontal, parallel side bars 1 and 2 with a curvilinear, integral front portion 3 and a tranverse member or cross-bar 4. All of the foregoing construction is steel tubing.

The rear ends of bars 1 and 2 are provided with bearing holders 5 for the reception of the rear wheel. An arched bar 6, of steel tubing, extends from the center of the curved front 3 to the bearing sleeve 7 for the steering post on front wheel fork 8.

Secured to sleeve 7 above bar 6, is a resilient truss bar 9 which is convolute in shape with its rear portion centered on the frame and welded, or otherwise suitably joined to the top of transverse bar 4 and to a second transverse bar 10 secured to the frame a suitable distance in the rear of transverse bar 4. On truss bar 9 is mounted the seat post 11 which is braced by the curved bars 12 extending rearwardly and laterally to the bars 1 and 2 of the frame. All of the aforesaid parts, except the holders for the rear wheel bearings are constructed out of steel tubing.

The resiliency of truss bar 9, which is facilitated by its integral joinder with the transverse bars 4 and 10, provides all essential spring action to absorb shocks due to inequalities in the surface of roads, thus obviating the use of springs or shock absorbers. The motor can be conveniently mounted on the frame between braces 12.

2

Provision is made for installation of the rear mud guard on the frame. Projecting upwardly from cross bar 10 and intermediate the side bars 1 and 2 is an elbow joint 13 to which the front of the mud guard 14, shown in dotted lines, is bolted. The braces for the rear of the mud guard are bolted to lugs 15 which project from the tops of the hanger straps 5, provided to hold the bearings for the rear-wheel axle.

Having thus described my invention, what I claim as new and desire to secure by Letters Patent, is:

1. A motor scooter frame comprising a curvilinear front portion and parallel side bars with integral, transverse connecting bars, bearing holders on the rear ends of said parallel bars, a truss bar connecting the curved portion of the front portion and extending to a point substantially forwardly thereof, a sleeve mounted on the truss bar and serving as the bearing sleeve for the steering post of the scooter, a curvilinear truss bar secured to said sleeve adjacent to the point of connection of the sleeve with the first truss bar above the first-mentioned truss bar, and to both of the transverse connecting bars centrally thereof, a seat post mounted on the top of said last-mentioned truss bar intermediate its connection with the transverse bars, and brace rods attached to said seat post and to the parallel side bars rearwardly of the seat post.

2. The device set forth in claim 1 and means for attaching a rear wheel mud guard to the frame, said means comprising an elbow joint connected to the rear transverse bar and projecting vertically therefrom for the connection of the mud guard thereto.

FLOYD G. CARR.

REFERENCES CITED

The following references are of record in the file of this patent:

UNITED STATES PATENTS

| Number | Name | Date |
| --- | --- | --- |
| D. 138,470 | Erickson | Aug. 8, 1944 |
| 1,924,363 | Kanai | Aug. 29, 1933 |

FOREIGN PATENTS

| Number | Country | Date |
| --- | --- | --- |
| 419,896 | Great Britain | Nov. 21, 1934 |